US012654366B2

(12) United States Patent
Nielsen et al.

(10) Patent No.: US 12,654,366 B2
(45) Date of Patent: Jun. 16, 2026

(54) OVEN, ADAPTED TO HEAT PREFORM BUILDING MATERIAL ARRANGED ON A TRANSPORTABLE, PLATE-LIKE MOLD CARRIER FOR PRODUCING PREFORM BUILDING ELEMENTS USED FOR BUILDING A ROTOR BLADE OF A WIND TURBINE

(71) Applicant: Siemens Gamesa Renewable Energy A/S, Brande (DK)

(72) Inventors: Anette Struve Nielsen, Galten (DK); Mogens Nielsen, Aalborg (DK); Samuel Robert van Oosterom, Queensland (AU); Enok Johannes Haahr Skjoelstrup, Aalborg Øst (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 337 days.

(21) Appl. No.: 18/287,110

(22) PCT Filed: Apr. 20, 2022

(86) PCT No.: PCT/EP2022/060405
§ 371 (c)(1),
(2) Date: Oct. 16, 2023

(87) PCT Pub. No.: WO2022/223607
PCT Pub. Date: Oct. 27, 2022

(65) Prior Publication Data
US 2024/0198561 A1      Jun. 20, 2024

(30) Foreign Application Priority Data

Apr. 23, 2021     (EP) ..................................... 21170151

(51) Int. Cl.
*B29C 31/08*          (2006.01)
*B29C 35/00*          (2006.01)
(Continued)

(52) U.S. Cl.
CPC .......... *B29C 35/045* (2013.01); *B29C 35/002* (2013.01); *B29C 35/0805* (2013.01);
(Continued)

(58) Field of Classification Search
CPC .... F27B 7/10; F27B 9/061; F27B 9/36; F27B 9/10; B29C 31/08; B29C 33/02; B29B 11/16
See application file for complete search history.

(56) References Cited

U.S. PATENT DOCUMENTS

| | | | | |
|---|---|---|---|---|
| 2017/0080635 A1* | 3/2017 | Zwicklhuber | .......... | B29C 71/02 |
| 2020/0384707 A1* | 12/2020 | Lehmann Madsen | .. | B29C 70/38 |

(Continued)

FOREIGN PATENT DOCUMENTS

| | | |
|---|---|---|
| CN | 1173284 A | 2/1998 |
| CN | 107619909 A | 1/2018 |

(Continued)

OTHER PUBLICATIONS

International Search Report and Written Opinion for PCT/EP2022/060405, mailed on Jul. 22, 2022.

*Primary Examiner* — Gregory A Wilson
(74) *Attorney, Agent, or Firm* — Schmeiser, Olsen & Watts LLP

(57)          ABSTRACT

An oven, adapted to heat preform building material arranged on a transportable, plate-like mold carrier for producing preform building elements used for building a rotor blade of a wind turbine is provided, with a housing adapted to receive several covered mold carriers and having a closable front and a closable rear opening for loading and unloading the (Continued)

mold carriers, wherein the housing includes several receiving means arranged in different levels with each receiving means being adapted to receive at least one mold carrier, and with several heating means assigned to the several intermediate spaces between vertically adjacent mold carriers and the spaces below and/or above the top and bottom mold carrier and adapted to heat the preform building material.

18 Claims, 7 Drawing Sheets

(51) Int. Cl.
  *B29C 35/04*        (2006.01)
  *B29C 35/08*        (2006.01)
  *B29L 31/08*        (2006.01)
(52) U.S. Cl.
  CPC   *B29C 2035/046* (2013.01); *B29C 2035/0822* (2013.01); *B29C 2035/0827* (2013.01); *B29L 2031/085* (2013.01)

(56)                    References Cited

U.S. PATENT DOCUMENTS

| | | | |
|---|---|---|---|
| 2022/0314498 A1 | 10/2022 | Ponnada | |
| 2024/0173898 A1* | 5/2024 | Nielsen | B29B 11/16 |

FOREIGN PATENT DOCUMENTS

| | | | | |
|---|---|---|---|---|
| CN | 109 501 320 A | 3/2019 | | |
| CN | 111 716 605 A | 9/2020 | | |
| EP | 1603723 B1 | 2/2008 | | |
| EP | 2661357 B1 | 2/2016 | | |
| EP | 2362824 B1 | 4/2016 | | |
| EP | 3102396 A1 | 12/2016 | | |
| EP | 2731772 B1 | 6/2017 | | |
| EP | 3018342 B1 | 1/2018 | | |
| EP | 4148365 A1 * | 3/2023 | | B29C 35/045 |
| EP | 4183543 A1 * | 5/2023 | | B29C 70/541 |
| FR | 2537840 A3 | 6/1984 | | |
| WO | 2019/115337 A1 | 6/2019 | | |
| WO | WO-2019115522 A1 * | 6/2019 | | B29C 70/42 |
| WO | 2019145240 A1 | 8/2019 | | |
| WO | 2022207329 A1 | 10/2022 | | |

* cited by examiner

OVEN, ADAPTED TO HEAT PREFORM BUILDING MATERIAL ARRANGED ON A TRANSPORTABLE, PLATE-LIKE MOLD CARRIER FOR PRODUCING PREFORM BUILDING ELEMENTS USED FOR BUILDING A ROTOR BLADE OF A WIND TURBINE

CROSS-REFERENCE TO RELATED APPLICATIONS

This application claims priority to PCT Application No. PCT/EP2022/060405, having a filing date of Apr. 20, 2022, which claims priority to European Application No. 21170151.1, having a filing date of Apr. 23, 2021, the entire contents both of which are hereby incorporated by reference.

FIELD OF TECHNOLOGY

The following relates to an oven, adapted to heat preform building material arranged on a transportable, plate-like mold carrier for producing preform building elements used for building a rotor blade of a wind turbine.

BACKGROUND

As commonly known, a wind turbine comprises among others several turbine blades attached to a hub. The blades interact with the wind making the hub rotate. To the hub a generator is coupled, which is driven by the rotating hub. The turbine blades of nowadays turbines have enormous dimensions in length and width. Their manufacturing is therefore difficult, as big parts need to be handled. One technology for producing such large blades uses preforms, which are preformed smaller blade parts used for building the respective blade shell. These prefabricated preforms are arranged and aligned according to the requested overall geometry of the blade and are finally connected respectively embedded in fiber mats and resin etc. for manufacturing the final large blade or blade part.

Each preform, which usually has a slightly bended geometry with a length of for example 10-12 m and a width of for example 3-5 m, is prefabricated in a specific mold. The mold comprises a respective form part, in which the preform building elements like fiber mats and a binding agent and, optionally, core elements, are arranged. These elements are fixated in the respective mold part by applying a vacuum, which mold part has a defined geometry corresponding to the requested blade geometry and is therefore in most cases tray-like. For this fixation, the preform building elements are covered with for example a foil, so that the vacuum can be applied to the space between the foil and the mold part, in which the building elements are arranged. Afterwards heat is supplied to the building elements in order to melt the locally positioned binding agent for locally fixing the fiber mats and the core elements etc. by gluing them in the binder matrix provided by the molten binding agent. After this heating operation the preform needs to be cooled to room temperature, whereafter it is sufficiently stable to be handled by a crane equipment or any other comparable handling or lifting means, usually a vacuum suction lifting equipment.

This way of producing the preforms is quite cumbersome. The molds used for producing the preforms are very complicated in their set-up, especially as a heating and cooling system needs to be provided in every mold. This makes the mold very expensive, having in mind that a large number of separate molds is necessary, as usually at least twenty or more preforms are needed for producing a blade or blade part. Further, as the respective mold geometry is designed for a respective geometry of the preform, an extensive reworking of the mold is necessary, when the preform geometry shall be changed, entailing also the adaption of the heating and cooling equipment.

Further, as both the heating and cooling treatment is performed with the preform building elements respectively the hot preform being arranged in the mold, the mold is occupied. As the heating and the cooling process takes a remarkable time, the whole mold is blocked during these long-lasting procedures, the productivity is extremely low. This is even enhanced, as the mold cannot be preheated. The temperature treatment needs to start from room temperature, as all building elements need to be separately arranged in the mold before their vacuum fixation, whereafter the heating may start. Further, it is necessary to cool the hot preform down to room temperature in order to secure its stability for handling it with the lifting equipment. Further, the time during which the respective mold is occupied may even be extended, as sometimes a preform is not removed immediately after cooling it but remains for a certain time in the mold if no storing capacity is given.

Finally, after lifting the preform out of the mold, it is necessary to thoroughly clean the mold surface for the next manufacturing process, which cleaning step also takes its time. Still the mold cannot be used, until this cleaning step is finished.

SUMMARY

An aspect relates to an improved possibility for heating the preform building material arranged in the mold.

To address the aspect, embodiments of the invention propose an oven, adapted to heat preform building material arranged on a transportable, plate-like mold carrier for producing preform building elements used for building a rotor blade of a wind turbine, with a housing adapted to receive several covered mold carriers and having a closable front and a closable rear opening for loading and unloading the mold carriers, wherein the housing comprises several receiving means arranged in different levels with each receiving means being adapted to receive at least one mold carrier, and with several heating means assigned to the several intermediate spaces between vertically adjacent mold carriers and the spaces below and/or above the top and bottom mold carrier and adapted to heat the preform building material.

Embodiments of the invention propose a specific oven, which is specifically designed to first receive several thin, plate-like mold carriers, wherein each mold carrier is provided or covered with a respective building material, which is vacuum-fixated arranged on the carrier. The mold carriers are arranged on respective receiving means, which receiving means are arranged vertically above each other so that the respective mold carriers are also arranged vertically one above the other with a certain distance respectively an intermediate space between two adjacent or neighboring mold carriers. Each receiving means is adapted to receive at least one plate-like mold carrier, which usually has a length of e.g., 10-12 meters. But it is also possible to arrange for example two of these mold carriers horizontally next to each other along their longitudinal axis, if the oven is accordingly adapted in size. Second, the oven is provided with respective heating means, which heating means are separately assigned to each intermediate space between two vertically adjacent or neighboring mold carriers as well as the space below the bottom or lowest mold carrier and the space above the highest or top mold carrier. The whole space in the oven is separated into respective smaller spaces by the respective plate-like mold carriers, as the receiving means are arranged at the vertical housing side walls, so that the respective mold carriers extend from one side wall to the other and almost from the loading end to the unloading end. The heating means are adapted to heat the respective space above and below the respective mold carriers, so that the building material is heated in order to melt the binding agent for fixing the respective building material like fiber mats or core elements etc. together. As the heating means are separately assigned to the respective spaces and therefore separately assigned to the respective mold carriers, all mold carriers are uniformly heated. The heating means are controlled by a common control means, so that the temperature can be kept constant throughout the oven space respectively the respective smaller spaces.

The inventive oven is based on the idea of a new mold design. Each mold, which is used for preparing the preform building material, comprises a mold base, for example a framework, to which removably a relatively thin plate-like mold carrier is attached. This mold carrier defines the form or geometry of the finally built preform and may therefore for example be trough-like or whatever preform geometry is needed. This new mold design allows to arrange the preform building material on the transportable mold carrier, to fix it on the mold carrier and to remove the transportable mold carrier from the framework-like mold base, to which a new plate-like mold carrier can be attached for again arranging new preform building material. The mold carrier covered with the preform building material can then be transported to the oven and loaded into the oven, wherein a larger number of separate mold carriers can be loaded into the oven depending on the number of receiving means. The oven may for example comprise 3-8 receiving means, depending on the geometry of the mold carriers respectively their cross-section geometry and the necessary distance between two adjacent mold carriers.

The inventive oven, as mentioned, allows to receive a larger number of mold carriers with the attached preform building material and is a separate heating arrangement, which is not in any mechanical relation to the mold itself. It is solely used for heating the building material. The oven can therefore be pre-heated so that it is constantly held on the respective process temperature. As several plate- or tray-like mold carriers with building material may simultaneously be arranged in the oven, they may all simultaneously be heated which contributes to raising the capacity and the throughput of the whole manufacturing process. The building material is for example heated to a temperature of e.g. 80°–100° C., wherein, as mentioned, the heating is controlled by a respective control means.

According to a first embodiment, each heating means may be hot air heating means comprising several heating air inlets and several heating air outlets for providing a heating airflow through the respective space. In this alternative, the heating is realized with tempered air which is blown into and is drawn out of the oven chamber. To realize this, respective air inlets and air outlets are provided which are assigned to the respective space so that each respective space is provided with its separate airflow. The hot air is tempered at a respective heating device, to which respective air pipes are connected, by which the air is distributed to the respective air inlets and by which the air being drawn out of the oven chamber is directed back for retempering. This allows to circulate the warm or hot air in a closed circuit, and to easily maintain the oven chamber on a desired constant temperature so that, when new carriers are loaded, no temperature ramp for heating up the chamber is necessary, as the oven is not cooled down.

Regarding the arrangement of the inlets and outlets, several alternatives are feasible. According to a first alternative, each of the heating means comprises several heating air inlets arranged at one side wall of the housing and several heating air outlets arranged at the opposite side of the housing allowing a transverse airflow, with the inlets and outlets being arranged in a row and assigned to the respective space. The oven itself is of rectangular shape, having a length for example of 12-15 meters and a width of for example 3-6 meters, depending on the size of the plate- or tray-like carriers. The arrangement of the inlets and outlets at the side walls allows for a transverse airflow. In an embodiment, an inlet is arranged opposite to an outlet allowing a direct airflow from an inlet to an outlet. Certainly, a respective larger number of inlets and outlets is provided at the side walls, with the inlets and the outlets assigned to a common space being arranged in a row, in an equidistant arrangement.

In a second alternative, each heating means may comprise several heating air inlets arranged at one end of the housing and several air outlets arranged at the other end of the housing allowing a longitudinal airflow, with the inlets and the outlets being assigned to the respective space. Here, all inlets are arranged close to either the front opening or the rear opening, while all outlets are arranged close to the other end respectively opening. So, the tempered air is blown into the oven chamber at one end and drawn from the chamber at the other end, a longitudinal airflow through each respective space is realized. It is possible that for example two, three or four inlets are arranged horizontally side by side and assigned to each respective space, while a respective number of outlets are also arranged horizontally side by side and assigned to the respective space. This allows to introduce a sufficiently high amount of hot air into the chamber and to draw a corresponding amount of air out of the chamber.

According to a third alternative, a heating means comprises several first heating air inlets arranged at one side wall of the housing and several first heating air outlets arranged at the opposite side wall of the housing allowing a transverse airflow, wherein the first inlets and first outlets are arranged at both ends of the housing realizing two first heating zones, and wherein the heating means comprises several second heating air inlets arranged closer to one end of the housing and several second heating air outlets arranged closer to the other end of the housing allowing a longitudinal airflow and realizing a second intermediate heating zone, with the first and second inlets and outlets being assigned to the respective space. This embodiment combines transverse and longitudinal airflow. The arrangement of the first inlets and outlets allows to realize two separate heating zones at the chamber ends. In these first heating zones a transverse airflow is realized, as the inlets and outlets are arranged opposite to each other. The second inlets and outlets are arranged to realize a longitudinal airflow in the second intermediate zone between the first zones. To realize this, the air inlets, which are arranged at both vertical side walls of the housing and opposite to each other, are arranged close to one of the first heating zones, while the second outlets, which are also arranged at both opposite side walls opposite to each other, are arranged closer to the other first heating zone. Each heating zone may for example have a length, seen in the longitudinal direction of the oven, of for example 2 meters, while the intermediate second heating zone has a length of 8 meters, with a complete chamber length of 12 meters.

The first and second heating zones are separated by respective separation means so that the respective airflows do not interact. Such a separation means may for example be an air curtain, which is realized by respective small curtain air inlets and outlets, which may have the size of longitudinal slit nozzles at both vertical side walls, so that respective sharp and slim air curtains may be realized in each space. Through the nozzles at one side walls the curtain air is blown in the chamber, with the nozzles at the opposite side walls the curtain air is drawn out of the chamber. Each air curtain certainly is realized in the transverse direction. In an alternative to this air curtain separation means, the separation means may also be realized by flexible mechanical curtains, which are assigned to each space, and which are removable. These mechanical curtains may for example be realized by a number of adjacent lamellae, which may for example be pushed to one side wall, when it is necessary to open each curtain, if it is desired to have an unseparated oven chamber. As the temperature in the oven is between 80°–100° C. these mechanical flexible curtains may be realized by respective polymer curtains respectively polymer lamellae, made of a respective heat resistant polymer.

The above-mentioned alternatives all comprise heating means realized as tempered air heating means. According to a second embodiment, a heating means may also be realized as comprising several heating elements arranged in the respective space. Each controllable heating element generates the respective heat itself, so that the respective heating is produced in the oven chamber itself. Along the length of the respective space, a sufficient number of separate heating elements is arranged in order to provide a constant heating throughout the whole space, so that the building material can be brought to a constant temperature in each section.

As a heating element, various elements may be used. According to a first alternative, a heating element may be a radiation heating element. Such a radiation heating element emits radiation allowing to heat up the respective building material. In an embodiment, a heating element is either an infrared radiation or an ultraviolet radiation heating element. These radiation elements are arranged such that they radiate directly on the upper side of the respective mold carrier, where the building material is arranged.

In a second alternative, a heating element may also be a resistance heating element. This element is heated by an electric current, it is therefore connected to a respective source. Also, these heating elements may be arranged such that they focus the emitted heat towards the upper side of each carrier and therefore the building material. Alternatively, the resistance heating elements may also be arranged close to the bottom side of each mold carrier, so that also the mold carrier is heated from below. It is certainly possible to arrange heating elements in the respective space focussing on the upper side of the carrier and to arrange heating elements in the space below and arranged close to the bottom side of each carrier, so that a heating is realized from both mold carrier sides. The respective resistance heating elements may for example be realized as respective wires or the like, which may be arranged in a desired geometry.

The radiation elements or the resistance elements are arranged in a necessary number within the respective space, one after the other seen in the longitudinal direction of the chamber in order to ascertain a constant temperature distribution throughout the whole space respectively chamber.

Finally, it is certainly possible to have heating elements of different type, i.e., radiation heating elements and resistance heating elements. Thus, each heating means comprises both radiation heating elements and resistance heating elements. For example, the radiation heating elements are arranged within the space above the preformed building material heating it from above, while the resistance heating elements are arranged below the respective mold carrier for heating the mold carrier from below.

Alternatively, or in addition to that, the heating means may also comprise both a hot air heating means and heating elements, no matter what type they are. This embodiment therefore combines a hot air heating with for example a resistance element heating, with the hot air heating the respective space, while the resistance elements are arranged below each mold carrier for mainly heating the mold carrier and through the mold carrier the building material arranged on it.

As mentioned, the oven comprises a front and a rear opening allowing to load and unload the mold carriers into and out of the oven. In an embodiment, each opening is closable by a door, especially a roller door, which door allows to almost seal the oven chamber from the surrounding. This allows to perfectly maintain the temperature within the chamber on a constant level.

In this regard, it is advantageous when means for realizing respective air curtains at the front and rear opening are provided. These air curtains provide a barrier at the front and rear opening, which prevents hot air flowing out of the chamber, when the respective opening is open, for example by opening the respective door, when a loading or unloading process is performed. This respective air curtain may only be provided when an opening shall be opened because otherwise, when the oven is closed, there is no need for such an air curtain. In an embodiment, these air curtains, just like the air curtains acting as a separation means, are realized by respective hot air being provided from the air heating device. A control which controls the airflow is adapted to control respective valves or the like within the pipe system or circuit, in order to distribute the air accordingly to where it is needed.

As mentioned, the oven comprises respective receiving means, each receiving means being adapted to accommodate at least one mold carrier. In an embodiment, due to the respective length of each mold carrier, a receiving means is adapted to just accommodate one mold carrier. Each receiving means may for example comprise guiding rails, arranged at the housing side walls, which allow for a very good and stable support of each mold carrier along its length respectively longitudinal edges. Each plate- or tray-like mold carrier is either made of a temperature-resistant polymer plate, a metal plate or sheet or for example of wood. It has, due to its length and width, a respective weight. This weight is evenly distributed along the rails, so that a proper support is realized.

For making the loading and unloading process comfortable, the guide rails comprise roller elements or sliding elements on which the respective mold carrier is guided. These rollers or sliding elements allow for a very comfortable movement of the mold carriers, which either roll on the respective roller elements or slide on the respective sliding elements, both lowering the friction, so that a simple and easy handling during the loading and unloading process is possible.

In a further embodiment, one or more airflow sensors and/or temperature sensors are provided which communication with a heating control which controls the heating means based on information provided by the sensors. These airflow sensors or temperature sensors allow to sample measurement values from the inner of the oven. This information is the basis for the control of the heating means. They allow to monitor the airflow respectively the air distribution within the chamber or the respective spaces, or the temperature distribution within the chamber or the spaces. The respective heating control can now control each separate heating means, be it and air heating means or a heating element of whatever kind, separately in order to control an even temperature distribution throughout the chamber respectively each space in order to uniformly heat each building material.

BRIEF DESCRIPTION

Some of the embodiments will be described in detail, with reference to the following figures, wherein like designations denote like members, wherein.

DETAILED DESCRIPTION

Figure 1:
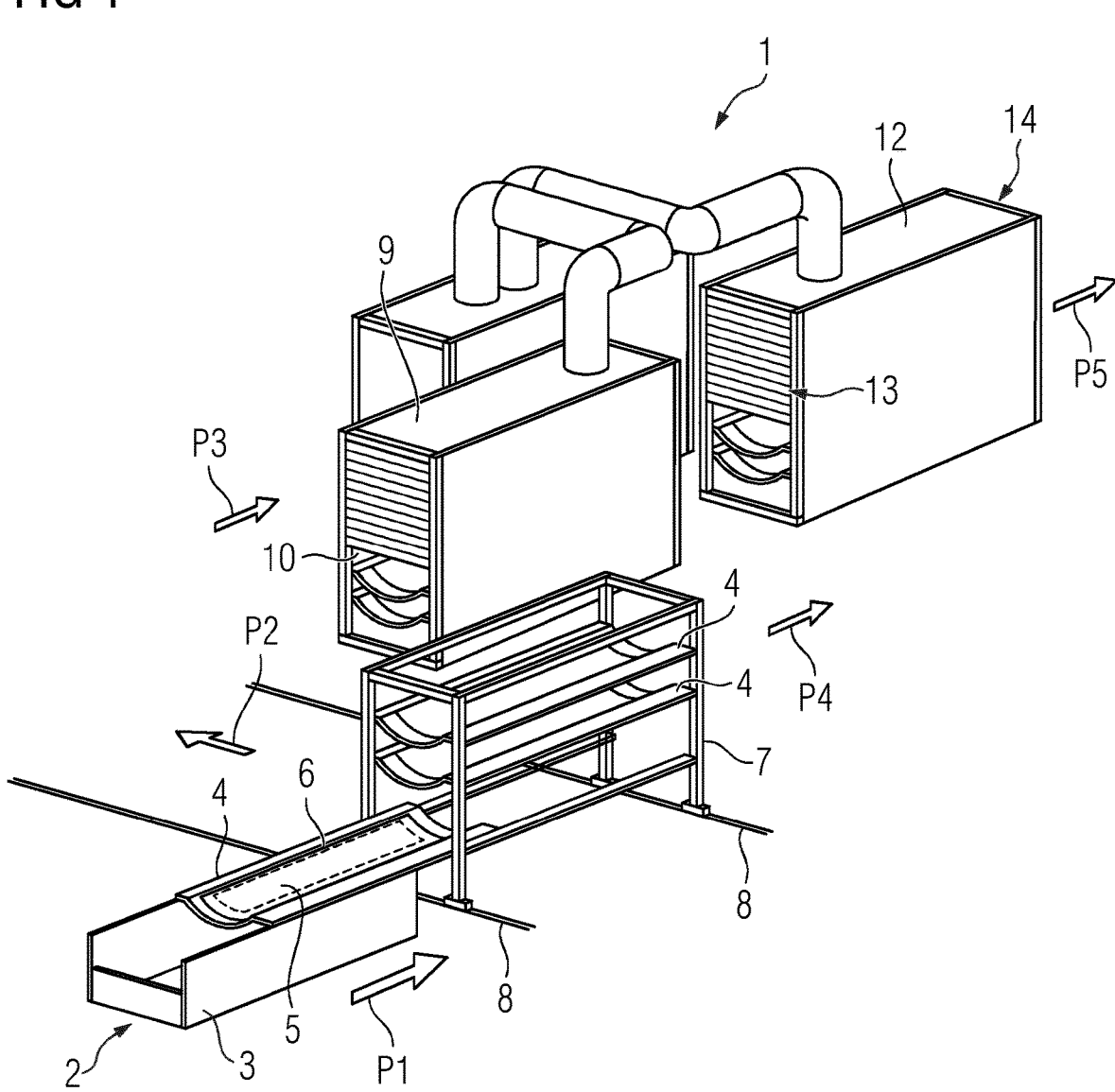
FIG. 1 is a principle illustration of a manufacturing arrangement of a preform comprising a modular mold, an oven and a cooling means.

FIG. 1 shows a manufacturing arrangement 1 for producing preforms for a wind turbine blade. It shows a mold 2 comprising a mold base 3 and a removable mold carrier 4, which is already partially removed from the mold base 3. Although only one mold 2 is shown, the manufacturing arrangement 1 comprises several of these molds 2 arranged side by side, all of which are modular molds comprising a mold base 3 and a removable mold carrier 4.

Arranged on the mold carrier 4 is preform building material 5 which is covered by a vacuum sealing foil 6. The building material 5 comprises fiber material like mats made of glass or carbon fibers, optionally at least one or several core elements for example made of wood like balsa wood or of a polymer foam or the like, and a binding agent usually in powder or granular form. The binding agent is provided only locally so that the building material respectively the mats and if provided the core elements are only locally fixed, when the binding agent has been molten and cooled again, as will be explained below. The building material 5 is vacuum-fixated on the mold carrier 4, as the vacuum sealing foil 6 seals a space between the foil 6 and the mold carrier 4, which is evacuated by a respective evacuation pump. The vacuum is maintained so that the mold carrier 4 can be transported.

The mold carrier 4 is, as shown by the arrow P1, partially already removed from the mold base 3 and loaded onto a transport means 7, here in form of a rack, where already several other mold carriers 4 with the respective building material 5 and vacuum sealing foils 6 are arranged. The transport means 7 moves on rails 8 along the row of molds 2 and receives the respective covered mold carriers 4. This rail guided movement is shown by the arrow P2.

The transport means 7 moves to an unloading position in which it is arranged adjacent to an oven 9, which has an opening 10, into which all covered mold carriers 4 can be loaded from the transport means 7. This unloading is shown by the arrow P3.

Figure 2:
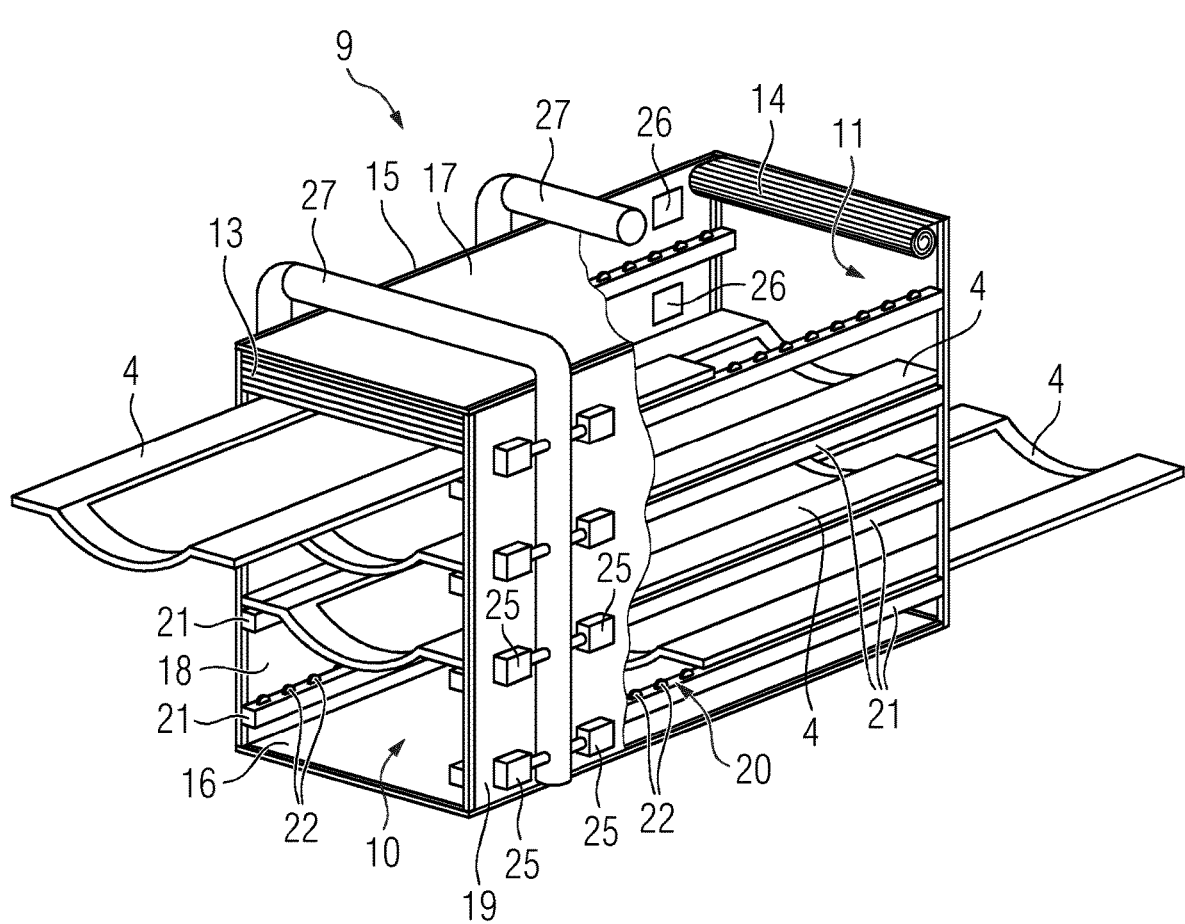
FIG. 2 is a perspective and partially cut open illustration of the oven.

In the oven, the preform building material 5 is heated so that the binding agent melts and wets respectively embeds the other building material like the fiber mats and core elements into a respective binder matrix. After this temperature treatment, the heated mold carriers 4 are unloaded from the oven 9 through a rear opening 11 as shown in FIG. 2 and are moved into a cooling means 12, where it is cooled down to room temperature. The cooling means 12, also box-like like the oven 9, comprises a respective front loading opening and a rear unload opening. The mold carrier transfer from the oven 9 into the cooling means 12 is shown by the arrow P4.

After the preform building material 5, which is fixed by the binding agent, is cooled, it is removed from the cooling means 12 as shown by the arrow P5. The mold carriers 4 with the respective finished preform elements may then either be stored until the respective preform is needed or they may be directly transported to a construction site where the blade is built. It is also possible to remove the finished preform element from the mold carrier 4 after the cooling stage and to store the fixed and form-stable preforms either in a storage or to transport only the preforms to the construction site.

FIG. 2 shows a perspective principle illustration of the in part cut-open oven 9. The oven 9 comprises a housing 15 having a bottom 16, a top wall 17 and two side walls 18, 19. The housing 15 is open at both ends having a front opening 10 and a rear opening 11. Both openings 10, 11 are closable via roller doors 13, 14, which are open in FIG. 2.

At the side walls 18, 19 respective receiving means 20 in form of guiding rails 21 are provided which extend almost over the entire length of the side walls 18, 19. The length of the housing 15 corresponds to the length of the mold carriers 4, which are received on the respective receiving means 20. The receiving means 20 respectively the guide rails 21 are arranged in different heights so that the separate mold carriers 4 are arrangeable one above the other, as shown in FIG. 2. The guiding rails 21 may be provided with roller elements 22, while also sliding elements may be provided. Both are easing the loading and unloading process, during which each mold carrier 4 is placed on a pair of guide rails 21 and pushed into the oven 2 respectively pulled out of the oven 2, as shown in FIG. 2. The upper mold carrier 4 is pushed into the oven 2, while the lowest mold carrier 4 is pulled out of the oven 2. This loading and unloading process may be performed manually or automatically.

As already mentioned, the guide rails 21 are arranged at the side walls 18, 19. When the mold carriers 4 are loaded into the oven 9, they separate the whole oven chamber into respective smaller spaces 23, as shown in the FIGS. 3-6. In these examples, four plate- or trough-like mold carriers 4 are arranged on the respective receiving means 20 respectively guide rails 21. They extend from one side wall 18 to the other side wall 19. As mentioned, the length of the oven chamber corresponds to the length of the mold carriers 4, so that each mold carrier 4 separates a respective space 23.

Figure 3:
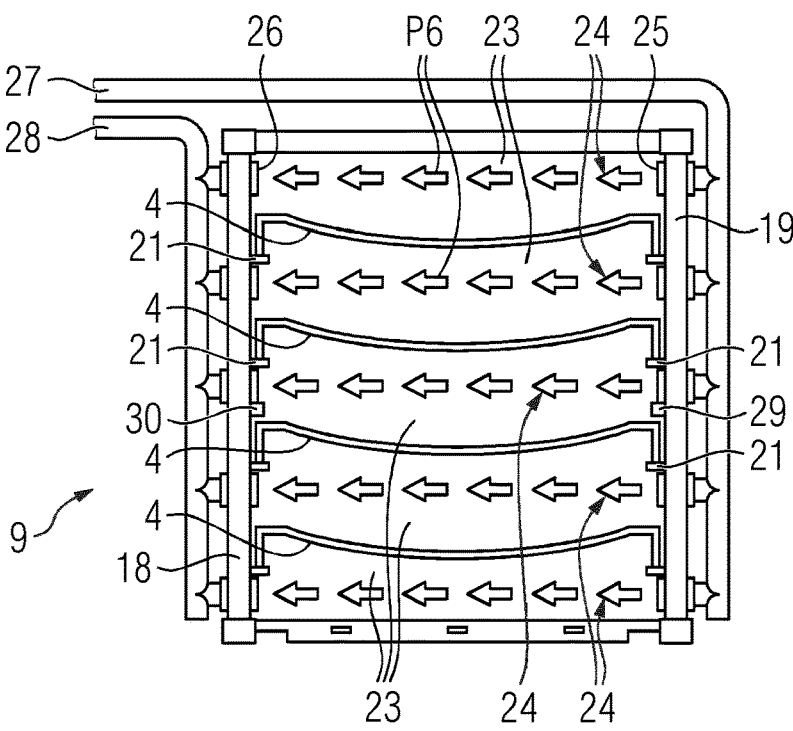
FIG. 3 is a principle illustration of an oven of a first embodiment with hot air heating means.

To each space 23 a heating means 24 is assigned, which heating means 24 is, according to the embodiment of FIG. 3, realized as a hot air heating means, which comprises several hot air inlets 25, here arranged at the side wall 19, and several hot air outlets 26 arranged at the side wall 18. To each separate space 23 a respective number of inlets 25 and outlets 26 is assigned. Several inlets 25 are arranged side by side along the length of the side wall 19, the same is true for the outlets 26 at the side wall 18. The inlets 25 arranged to each space 23 are arranged in a horizontal row, the same is true for the respective outlets 26. The inlets 25 are directly opposite to the outlets 26 in each level respectively space 23.

Via the inlets 25 hot air, which has a temperature exactly corresponding to the desired temperature in the oven 9, is blown into the respective space 23, as shown by the arrows P6. It exits the chamber respectively space 23 via the respective outlets 26. Both, the inlets 25 and outlets 26 are connected to respective pipes 27, 28 as shown in FIG. 3, which pipes 27, 28 are coupled to an air temperature device which heats the air before it is blown into the chamber. A respective control is provided which controls the temperature and airflow. To control this, airflow sensors 29 and/or temperature sensors 30 may be arranged in the oven chamber respectively in each space 23. Although FIG. 3 shows only one airflow sensor 29 and one temperature sensor 30, several of these sensors may be distributed in each separate space 23 in order to measure each space specific airflow and temperature in order to specifically control the airflow respectively the heating via the overall control device. This may be done for example by controlling respective valves which are connected for example to the respective inlets 25 in order to vary the airflow respectively amount of air, or by controlling the air temperature etc.

Figure 4:
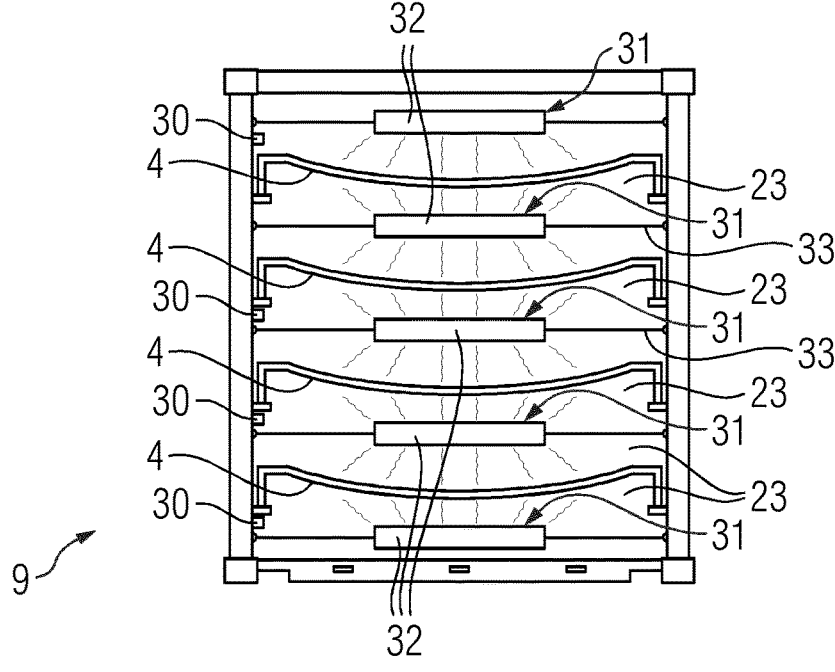
FIG. 4 is a principle illustration of an oven of a second embodiment with heating elements in form of resistance heating elements.

FIG. 4 shows another embodiment of an oven 9, in which again four mold carriers 4 are loaded. They again divide the oven chamber into five separate spaces 23. Each chamber 23 is assigned with a number of heating elements 31. Each heating element is for example a resistance heating element 32, which is connected via respective cables 33 to a not shown power source so that they can be heated by controlling a respective current. Each resistance heating element 32 is for example designed like a longitudinal rod or the like, which extends in a transverse direction, so that in each space a certain number of these resistance heating elements 32 are arranged in a row and parallel to each other.

As shown, the resistance heating elements emit the heat as well to the upper surface of each mold carrier 4, where the building material is arranged, as to the bottom side of the respective mold carrier 4, so that also this type of heating element 31 allows a very even tempering of the mold carriers 4 respectively the building material in order to melt the binding agent.

Again, several temperature sensors 30 are distributed within the spaces 23 allowing to monitor the temperature respectively temperature distribution within each chamber. These measured values are provided to the control device controlling the heating elements 31, which may be individually controlled so that it is possible to immediately react if any inconsistency regarding the temperature distribution respectively the temperature level is recognized.

Alternatively, this kind of heating elements 31 could also be realized as radiation elements, i.e. radiation lamps, which emit an ultraviolet or infrared radiation. These radiation elements respectively lamps may be of cylindrical shape so that they emit the radiation in all directions. Also, these radiation elements are connected to a power source and may be individually controlled by a control device, again based on temperature sensor information. These radiation elements respectively radiation lamps also allow to evenly temper the building material for melting the binding agent.

Figure 5:
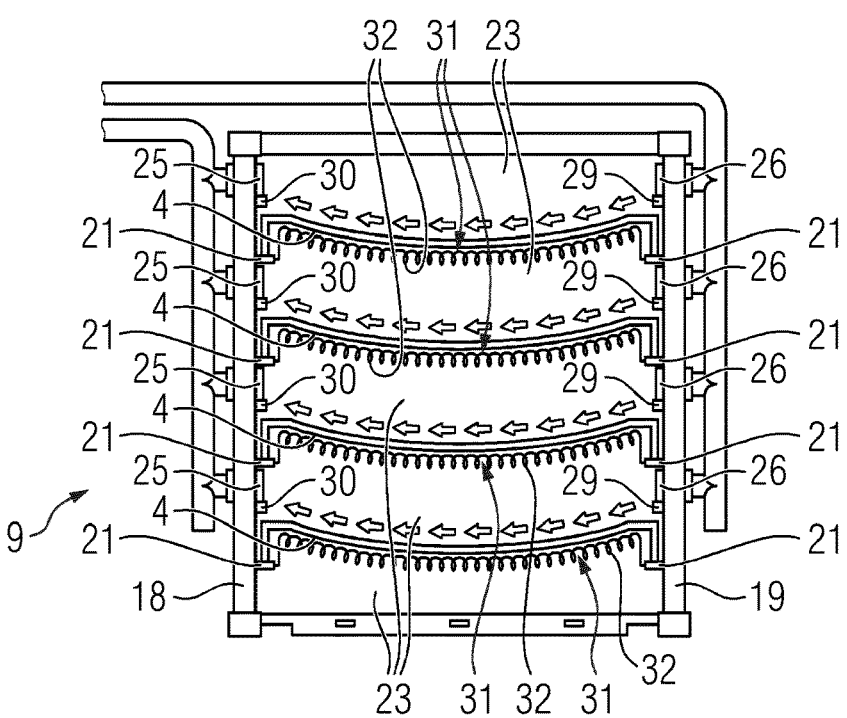
FIG. 5 is a principle illustration of an oven of a third embodiment with heating means comprising hot air heating means and resistance heating elements.

Another embodiment of an oven 9 is shown in FIG. 5. Again, four mold carriers 4 with respective building material 5 are arranged on the respective receiving means 20 respectively the guiding rails 21, just like in the other embodiments. The mold carriers 4 divide the chamber volume into five separate spaces 23.

In this embodiment, the heating means comprises hot air heating means and heating elements. As shown, to the spaces 23, which are above the upper side of each mold carrier 4 respectively the building material, hot air heating means comprising hot air inlets 25 and hot air outlets 26 are provided, wherein several inlets 24 and outlets 25 are arranged in a row and are assigned to each respective space 23. The inlets 24 and outlets 25 again may be arranged opposite to each other in the respective side walls 18, 19.

In addition to the hot air heating means, also separate heating elements 31 are provided, which are again resistance heating elements 32, here in the form of heating wires which are connected to a respective power source which is controlled by a control device, just like the hot air heating means. The resistance heating elements 32 are arranged directly below each mold carrier 4 so that they almost directly heat the mold carrier 4 from below and thus heat the building material from below. The several resistance heating elements 32 assigned to a space 23 are arranged in parallel along the length of the space 23, but extend in a transverse direction.

Airflow sensors 29 are provided to sense the airflow in the respective chambers, as well as temperature sensors 30 in order to sense the temperature in the respective space 23.

In this embodiment, the control device may control two different types of heating means so that several degrees of freedom in controlling the heating of the respective space are provided. So, the control device may, depending on the respective sensor information, individually control either one or all of the hot air heating means or one or all of the heating elements in order to control an even temperature distribution.

Figure 6:
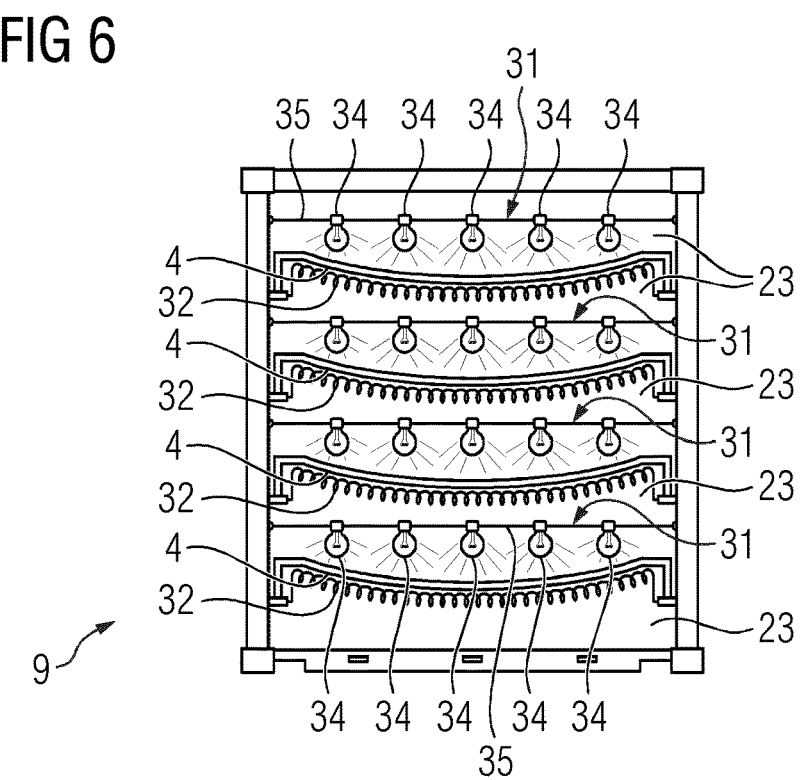
FIG. 6 is a principle illustration of an oven of a fourth embodiment with heating means comprising radiation heating elements and resistance heating elements.

FIG. 6 shows an example of an oven 9, again comprising four loaded mold carriers 4 with respective building material which divide the oven chamber into five spaces 23. Also, in this embodiment, different types of heating means are provided. In the spaces 23, above the upper side of the mold carriers 4 and therefore above the building material, separate heating elements 31, here in form of radiation elements 34, simplified shown as light bulbs, are provided which are connected via respective cables 35 to a power source and a control device. As shown, several of these separate radiation elements 34 respectively infrared or ultraviolet light bulbs are arranged in a row extending in a transverse direction. In each chamber 23, several of these rows are arranged. As shown, they radiate towards the upper side of each carrier 4 and therefore directly towards the building material.

Just like at the embodiment of FIG. 5, in addition also further heating elements 31 in form of radiation heating elements 34 are provided, again directly underneath each mold carrier 4. They are used to heat the mold carrier 4 and the building material from below. They extend in a transverse direction, while several of these separate resistance heating elements 32 are arranged in parallel, seen in the longitudinal chamber direction, in each space 23.

Again, the control device is adapted to control different types of heating elements, i.e. radiation heating elements 34 and resistance heating elements 32, which are separately controllable in order to control a constant and even temperature distribution.

Figure 7:
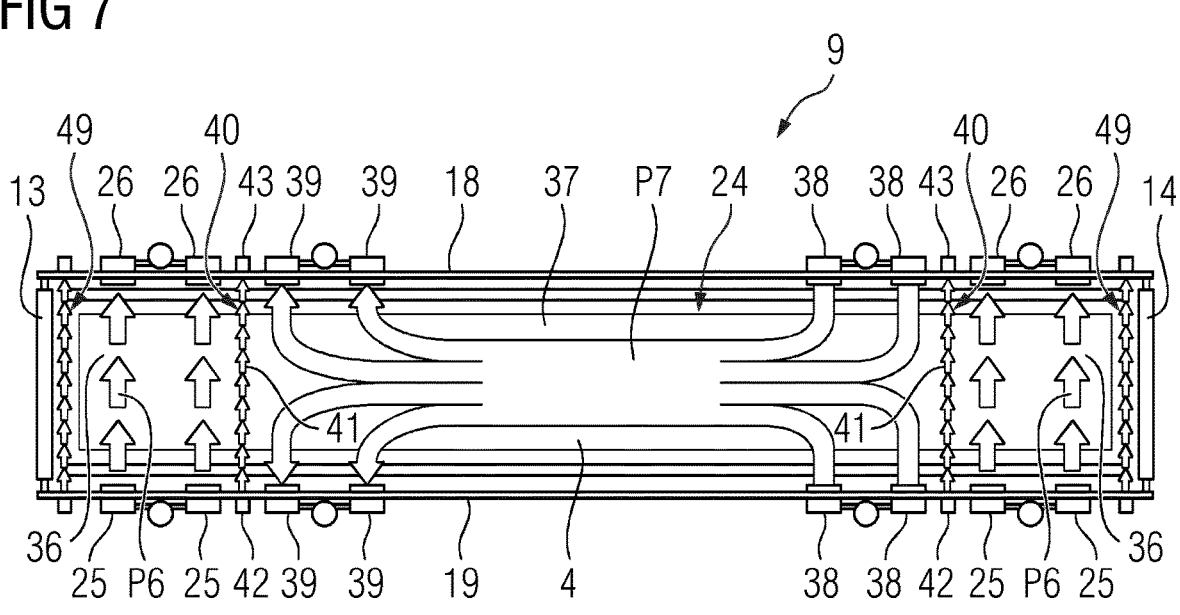
FIG. 7 is a principle top view of the oven with a heating means arrangement of a first embodiment.

FIG. 7 shows another embodiment of an oven 9, in which only hot air heating means 24 are provided. These hot air heating means 24 comprise several first hot air inlets 25, and several first hot air heating outlets 26, which are arranged at the respective side walls 18, 19, and which are assigned to each respective space 23, as the oven chamber again is divided into the respective spaces by the loaded mold carriers 4, which are not shown.

The first inlets 25 and outlets 26 are arranged at both ends of the housing 15, as clearly shown in FIG. 7. They realize two first heating zones 36 at both ends, directly connecting to the respective door 13, 14 opening and closing the respective openings 10, 11. In these first heating zones 36, a transverse hot airflow is provided, as shown by the arrows P6.

Furthermore, in the zone between the two first heating zones 36, a second intermediate heating zone 37 is realized with a longitudinal hot airflow, as shown by the arrows P7. To realize this, several second hot air inlets 38 are arranged opposite to each other and at both side walls 18, 19, adjacent to the right hand side first heating zone 36 in FIG. 7. Further, second hot air outlets 39 are provided closer to the left hand first heating zone 36 and opposite to each other at both side walls 18, 19. Again, to each space 23 a certain number of second inlets 38 and outlets 39 is assigned.

It is obvious that the hot air is blown into this intermediate space respectively second heating zone 37 at one end via the inlets 38, flows in a longitudinal direction and is drawn out of this second heating zone 37 via the outlets 39. So, in this embodiment, three separate heating zones 36, 37 are provided, two of them with a transverse hot airflow and one intermediate zone with a longitudinal airflow.

The zones 36 and 37 are separated by a separation means 40, here in form of respective air curtains 41, which are realized by respective nozzles 42, 43 arranged opposite to each other in the respective side walls 18, 19. They are like air barriers, so that the respective airflows in the neighboring heating zone 36, 37 do not interact or mix.

Again, an overall control device is provided which controls the hot air circuit respectively the air blower arranged in it and respective valves assigned to the respective inlets 25, 38 and/or outlets 26, 39 in order to individually or separately control the airflow in each heating zone 36, 37. Although not shown, several airflow sensors 29 and temperature sensors 30 may be distributed within the respective zone 36, 37 to monitor the airflow and temperature, based on which the control may be realized.

Figure 8:
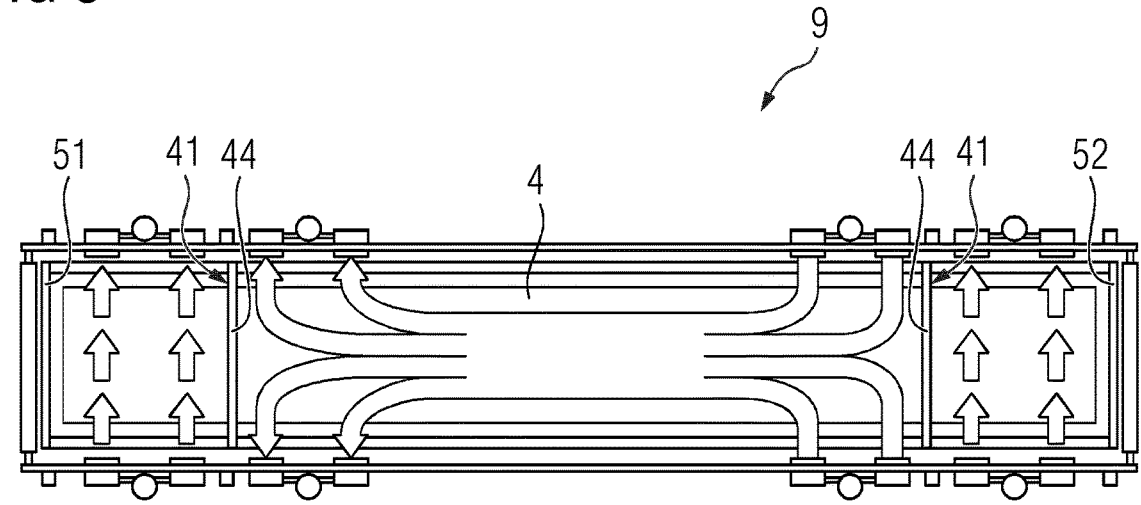
FIG. 8 is a principle top view of the oven with a heating means arrangement of a second embodiment.
Figure 9:
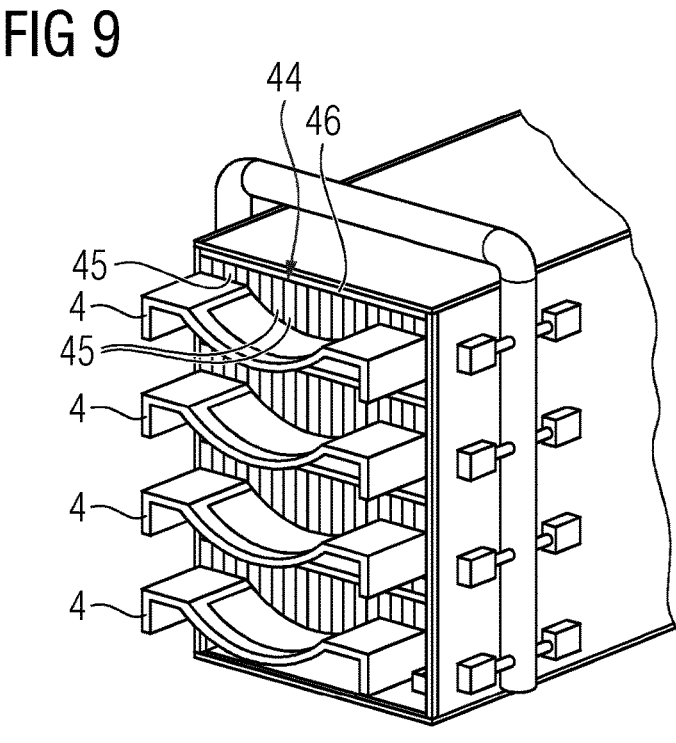
FIG. 9 is a perspective partial view of the oven according to FIG. 4 showing a separation means.

FIG. 8 shows an embodiment of an oven 9 which is identical to the setup of the oven shown in FIG. 7. Therefore, reference is made to the above explanation. The only difference is that the respective separation means 41 in this embodiment is realized by respective flexible mechanical curtains 44 which are, see FIG. 9, assigned to each space 23 extending above each mold carrier 4. Each curtain 44 comprises a certain number of separate lamellae 45, which are arranged on respective guide rails 46 so that they are removable respectively can be pushed to one side wall, if the respective space shall be opened, and can be moved to the separating curtain form when the space shall be closed. This can be done manually or automatically by a respective device.

Although not shown, it is possible to also arrange at the upper side of each rail 24 another curtain means which abuts the bottom side of each mold carrier 4 so that also here a complete closure is given. Another alternative is that the rails 46 are somehow bent corresponding to the bottom shape of each mold carrier 4.

Figure 10:
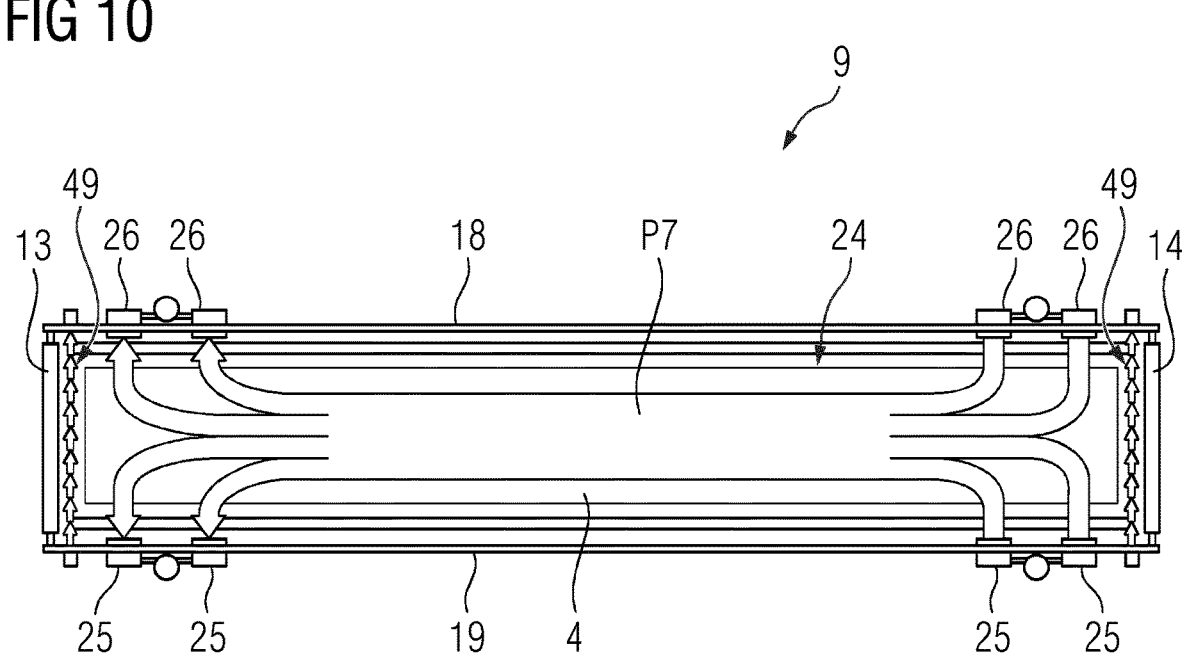
FIG. 10 is a principle top view of the oven with a heating means arrangement of a third embodiment.

FIG. 10 shows another more simplified embodiment of an oven 9 comprising a hot air heating means 24, where only a longitudinal airflow as shown by the arrows P7 is realized. In this embodiment, hot air inlets 25 are arranged on both side walls 18, 19 and opposite to each other at one housing end closer to the respective door 14, while the respective hot air outlets 26 are arranged closer to the other end of the housing next to the door 13. Again, the chamber volume is divided into the respective spaces 23 by the mold carriers 4, one of which is only shown in this top view. Therefore, the respective inlets 25 and outlets 26 are assigned to each separate space 23 and therefore are vertically arranged above each other corresponding to the vertically stacked spaces 23.

The airflow and/or temperature may be measured with respective airflow sensors 29 and temperature sensors 30, which are not shown in detail in this embodiment, just like at the embodiments of FIGS. 7 and 8. An overall control device is again adapted to control the respective hot air cycle respectively the air blower and respective valves etc., as already mentioned.

Figure 11:
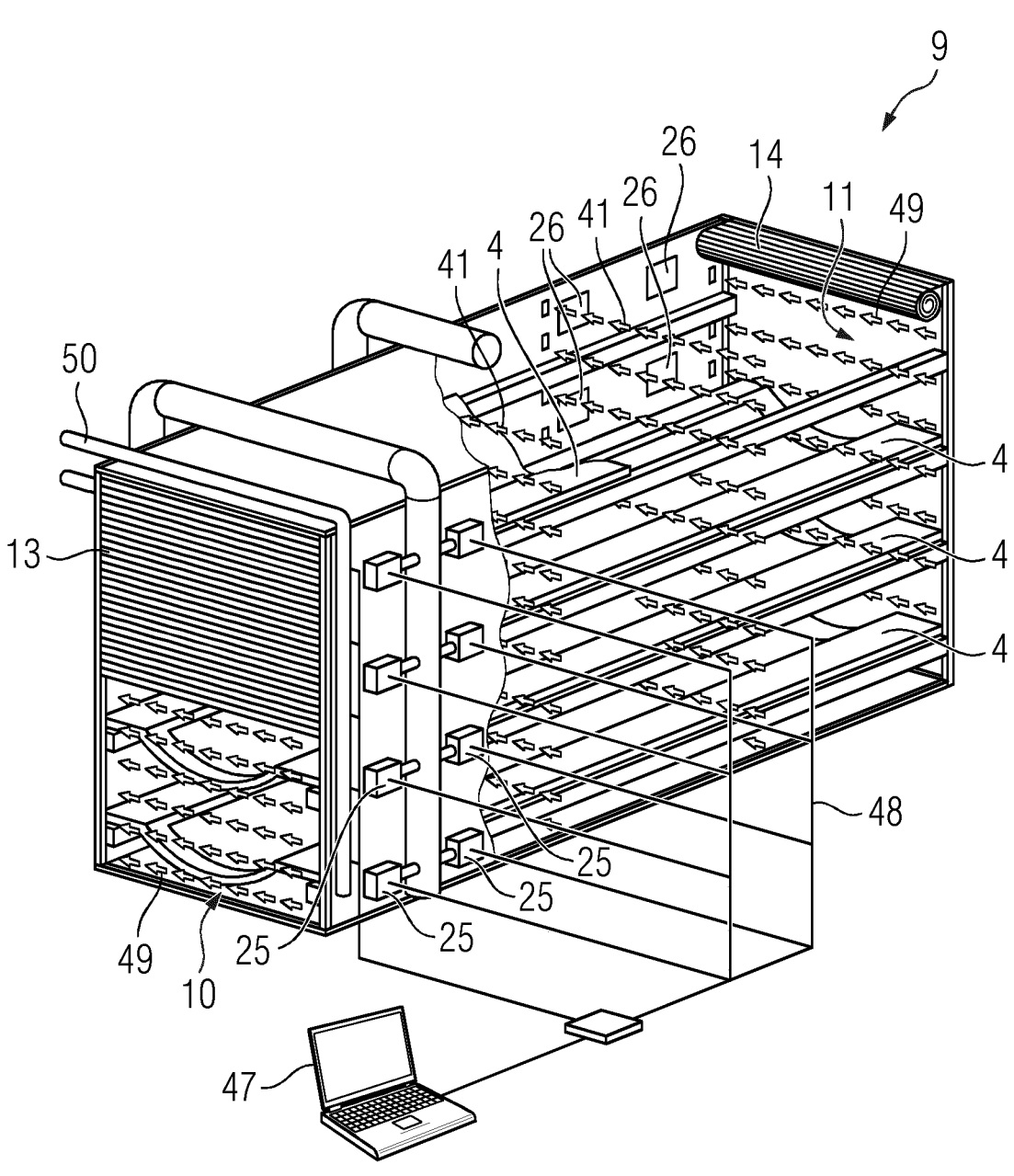
FIG. 11 is a perspective and partial cut open illustration of an oven of a further embodiment.

FIG. 11 shows a perspective, partially cut view of an oven 9 which corresponds to the version shown in FIG. 7. It shows the several mold carriers 4 dividing the chamber in the respective spaces 23. It also shows some hot air inlets 25 and some hot air outlets 26. As mentioned, they are connected to respective pipes of an air circuit. Further shown is a control device 47 like a computer or the like, controlling the respective hot air heating means by controlling respective valves or the like, which are connected by a respective wiring 48 to the control device 47.

Also shown are the air curtains 41 dividing the two first heating zones 36 from the intermediate second heating zone 37, as explained in regard to FIG. 7.

Further in this embodiment, both doors 13, 14 are shown partially opened. In order to avoid hot air flowing out of the oven when one or both doors 13, 14 are opened, respective further transverse air curtains 49 provided respectively realized by respective air curtain means like not further shown nozzles in the side walls 18, 19, which are connected to respective pipes 50. These air curtains 49 seal both openings 10, 11, preventing any hot air flowing out of the oven. Also these air curtains 49 may be controlled via the control device 47. They may be permanently realized or only when one of the doors 13, 14 opens. They are then switched automatically. The loading and unloading process is possible even if the air curtains 49 are active, as it is easily possible to push or pull a mold carrier 4 through such an air curtain 49. The same is true for any of the air curtains 41.

These air curtains 49 are also shown in the embodiments of FIGS. 7 and 10.

In an alternative, as shown in FIG. 8, instead of these air curtains 49, also mechanical curtains 51 may be provided, which may be realized as lamellae curtains or the like which extend from the top to the bottom of the chamber. These mechanical curtains 51 may also be realized just like the curtains 44 so that they allow the loading and unloading of a mold carrier 4 even if the curtain 51 is closed.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An oven, configured to heat preform building material arranged on a transportable, plate-like mold carrier for producing preform building elements used for building a rotor blade of a wind turbine, comprising:

a housing configured to receive several covered mold carriers and having a closable front and a closable rear opening for loading and unloading the mold carriers, wherein the housing comprises several receiving means arranged in different levels with each receiving means being configured to receive at least one mold carrier; and several heating means assigned to several intermediate spaces between vertically adjacent mold carriers and spaces below and/or above a top and bottom mold carrier and configured to heat the preform building material.

2. The oven according to claim 1, wherein a heating means is a hot air heating means and comprises several heating air inlets and several heating air outlets for providing a heating air flow through the respective space.

3. The oven according to claim 2, wherein the heating means comprises several heating air inlets arranged at one side wall of the housing and several heating air outlets arranged at an opposite side wall of the housing allowing a transvers air flow, with the inlets and outlets being arranged in a row and assigned to the respective space.

4. The oven according to claim 3, wherein each inlet is arranged opposite to an outlet.

5. The oven according to claim 2, wherein the heating means comprises several heating air inlets arranged at one end of the housing and several heating air outlets arranged at the other end of the housing allowing a longitudinal air flow, with the inlets and the outlets being assigned to the respective space.

6. The oven according to claim 2, wherein the heating means comprises several first heating air inlets arranged at one side wall of the housing and several first heating air outlets arranged at the opposite side wall of the housing allowing a transvers air flow, wherein the first inlets and first outlets are arranged at both ends of the housing realizing two first heating zones, and wherein the heating means comprises several second heating air inlets arranged closer to one end of the housing and several second heating air outlets arranged closer to the other end of the housing allowing a longitudinal air flow and realizing a second intermediate heating zone, with the first and second inlets and outlets being assigned to the respective space.

7. The oven according to claim 6, wherein the first and second heating zones are separated by respective separation means.

8. The oven according to claim 7, wherein the separation means are air curtains or flexible mechanical curtains assigned to each space and are removable.

9. The oven according to claim 2, wherein the heating means comprises both a hot air heating means and heating elements.

10. The oven according to claim 1, wherein a heating means comprises several heating elements arranged in the space.

11. The oven according to claim 10, wherein a heating element is a radiation heating element or a resistance heating element.

12. The oven according to claim 11, wherein the radiation heating element is an infrared radiation or ultraviolet radiation heating element.

13. The oven according to claim 10, wherein the heating means comprises both radiation heating elements and resistance heating elements.

14. The oven according to claim 1, wherein the closable front opening and the closable rear opening is closable by a door.

15. The oven according to claim 1, wherein means for realizing respective air curtains at the closable front opening and the closable rear opening or flexible mechanical curtains at the closable front opening and the closable rear opening are provided.

16. The oven according to claim 1, wherein the receiving means comprise guiding rails, arranged at the housing side walls.

17. The oven according to claim 16, wherein the guiding rails comprise roller elements or sliding elements on which the respective mold carrier is guided.

18. The oven according to claim 1, wherein one or more air flow sensors and/or temperature sensors are provided, which communicate with a heating control, which controls the heating means based on information provided by the sensors.

* * * * *